United States Patent [19]

Esser et al.

[11] 4,223,095

[45] Sep. 16, 1980

[54] FLAME-RESISTANT POLYURETHANE FOAM AND A PROCESS FOR ITS PRODUCTION

[75] Inventors: Heinz Esser, Burscheid; Hans W. Illger, Roesrath; Heinz Müller, Leverkusen; Willi Kost, Cologne; Alberto C. Gonzalez-Dörner, Leverkusen, all of Fed. Rep. of Germany

[73] Assignee: Bayer Aktiengesellschaft, Fed. Rep. of Germany

[21] Appl. No.: 964,669

[22] Filed: Nov. 29, 1978

[30] Foreign Application Priority Data

Dec. 6, 1977 [DE] Fed. Rep. of Germany ....... 2754313

[51] Int. Cl.$^2$ ..................... C08G 18/14; C08G 18/83; B32B 3/26; B32B 5/18

[52] U.S. Cl. ..................... 521/55; 427/209; 427/296; 427/372.2; 427/421; 428/311; 428/315; 428/921; 521/53; 521/54

[58] Field of Search ..................... 521/53, 54, 55, 903, 521/906; 428/310, 311, 315, 921; 427/209, 296, 372 R, 421, 430 R

[56] References Cited

U.S. PATENT DOCUMENTS 4,169,184   9/1979   Pufahl ................................ 428/311

Primary Examiner—William J. Van Balen
Attorney, Agent, or Firm—Connolly and Hutz

[57] ABSTRACT

A flame-resistant polyurethane foam is obtained by treatment of the foam with a mixture of aluminium hydroxide and a carboxyl group-containing polychloroprene latex and cross-linking the latex with zinc oxide or magnesium oxide.

7 Claims, No Drawings

FLAME-RESISTANT POLYURETHANE FOAM AND A PROCESS FOR ITS PRODUCTION

This invention relates to flame-resistant polyurethane foam and to a process for its production by treatment of the foam with a mixture of a polychloroprene latex which contains carboxyl groups and aluminium hydroxide and crosslinking the latex with zinc oxide or magnesium oxide.

It is already known from British Pat. No. No. 977,929 that the inflammability of foams can be reduced by treatment with vulcanisable elastomer latices. Vulcanisation is carried out with sulphur in the usual manner, by the addition of the known vulcanisation accelerators which contain sulphur. One disadvantage of this method is the relatively high vulcanisation temperature required, which is liable to have a deleterious effect on the properties of the foam. Moreover, it has been found that the reduction of inflammability by means of elastomer latices which are cross-linked with sulphur is not always satisfactory.

A process in which inorgaic flame-inhibiting additives such as magnesium carbonate or aluminium hydroxide are introduced into a foam by means of elastomer latices in order to render it flame-resistant has been proposed in German Offenlegungsschrift No. 2 649 222. This process also includes cross-linking of the latices with sulphur after impregnation of the foam, with the associated disadvantages already mentioned above.

It has now been found that flame-resistant polyurethane foams are obtained by treating the foams with a mixture of a polychloroprene latex containing carboxyl groups and aluminium hydroxide and cross-linking the latex with zinc oxide or magnesium oxide.

Accordingly, this invention relates to flame-resistant polyurethane foam and to a process for its production by treatment of the foam with a mixture of an elastomer latex which is capable of being cross-linked and a flame-inhibiting additive, characterised in that the polyurethane foam is treated with a mixture of a carboxyl group-containing polychloroprene latex and aluminium hydroxide and the latex is cross-linked with zinc oxide or magnesium oxide.

Both unformed and formed polyurethane foams may be treated by this process. It is preferred, however, to apply the process to finished polyurethane foam parts.

The carboxyl group-containing chloroprene polymers which are suitable for impregnation are copolymers of acrylic acid and/or methacrylic acid. They contain from 1–7% by weight, preferably from 3–5% by weight of carboxylic acid units chemically incorporated by polymerisation. These elastomers are used in the form of their latices having a solids content of from 30–70% by weight, preferably from 40–60% by weight. The latices may, in addition, contain small amounts of the usual additives such as methyl cellulose. To prepare the mixture suitable for impregnation, aluminium hydroxide is incorporated in such a polychloroprene latex in a quantity of approximately 1–5 times of the weight, preferably 1–2 times of the weight of the solid content of the latex. From 5–10% by weight of suitable surface-active substances, e.g,. ethoxylated alkyl phenols and-/or sulphonated wetting agents such as alkyl sulphonates are generally added to facilitate incorporation of the aluminium hydroxide and to stabilise the latex. Silicone emulsions may additionally be added to prevent excessive foaming.

Other flame-retarding compounds, e.g. halogenated hydrocarbons such as pentabromo toluene and/or antimony trioxide may be added to the latex in quantities of from 5–30% by weight in addition to the aluminium hydroxide. Antimony trioxide is particularly suitable for increasing the flame-retarding action of the mixture of polychloroprene and aluminium hydroxide because in the event of fire it is converted into antimonyl chloride, which is itself also flame-retarding.

The impregnating mixture also contains magnesium oxide or zinc oxide, which compounds partly act as cross-linking agents for the elastomer. The mixture contains the cross-linking agent in a quantity of from 1–3 mol, preferably from 1.5–2.5 mol, based on 1 mol of the carboxyl groups of the polychloroprene. The mixture contains a total of from 5–15 parts by weight, preferably from 7.5–10 parts by weight of zinc oxide or magnesium oxide, based on 100 parts by weight of rubber solid content.

In addition to the above mentioned constituents, the mixture may contain other additives such as pigments or age resistors. The various components of the mixture must, of course, be compatible with each other, and must not have any deleterious effect on each other.

The mixture used for treating the polyurethane foam, which mixture is obtained by addition of the above mentioned constituents to a polychloroprene latex, is in the form of a dispersion or suspension having a solids content of from 40–80% by weight, preferably from 60–70% by weight. The quantity of mixture used for treating the foam which is to be impregnated depends mainly on the fire characteristics to which the treated foam must subsequently conform. The foam is generally treated with a quantity of mixture corresponding to an uptake of solid content of from 10–800%, preferably from 15–350% of the original weight of the foam, that is to say with from 0.1–8 times its own quantity. The foam may be impregnated either completely or only partly, for example only on its surface. For complete impregnation, the foam is saturated with the mixture, e.g. by immersion, and the excess is then, for example, squeezed off. If only the surface is to be impregnated, then the mixture may be introduced into the foam by spraying. Coating or incorporation of the mixture by suction under vacuum are other possible forms if treatment.

After the above treatment, the moisture in the foam is removed by drying at an elevated temperature and the elastomer introduced into the foam is at the same time cross-linked. It is a special advantage of the process according to the invention that cross-linking of the elastomer will take place at temperatures just sufficient for drying, i.e., at approximately 100° C. or slightly higher. Any thermal damage to the foam in the cross-linking process is thereby kept to a minimum. It has been surprisingly found that in spite of the relatively low temperature employed for cross-linking, the time required is not longer but in many cases shorter than that hitherto required for the usual process of vulcanisation with sulphur.

The process according to the invention has the additional advantage of eliminating the use of the vulcanisation accelerators which were previously required and which frequently caused the development of noxious odours and the release of toxic gases on combustion. Furthermore, the carboxyl group-containing latex used in the present process is at a neutral pH and is therefore more readily compatible with other components of the mixture than the alkaline latices which were cross-linked with sulphur hitherto employed. The process according to the invention provides a more gentle, rapid and inexpensive means of manufacturing flame-resistant foams.

The following example serves to further illustrate the invention.

EXAMPLE

A polyetherurethane foam was either impregnated or sprayed on both sides in accordance with the invention with a mixture which had been prepared in the form of a dispersion from the following components: 200 g of a 50% by weight latex of a copolymer of 96% by weight of chloroprene and 4% by weight of methacrylic acid; 3.3 g of a 33% by weight aqueous dispersion of diphenylamine modified with styrene; 164.5 g of a 1% by weight aqueous solution of methyl cellulose; 125.0 g of aluminium hydroxide; 15.0 g of pentabromo toluene; 10.0 g of active zinc oxide; 15.0 g of a 20% by weight aqueous solution of a polyglycol ether of 1 mol of nonyl phenol and ca. 10 mol of ethylene oxide.

The mixture used for spraying in addition contained 2.0 g of an organic red pigment suspended in 2.0 g of water whereas the mixture used for impregnation in addition contained 3.0 g of a silicone oil emulsion (polysiloxane methyl ether) and 2.0 g of carbon black suspended in 2.0 g of water.

The foam which had been impregnated was dried at 130° C. for 45 minutes whereas the foam which had been sprayed on both sides was dried at 130° C. for 5 minutes on each side. Table 1 shows the mechanical properties and Table 2 the fire characteristics of the untreated foam (I), the sprayed foam (II) and the impregnated foam (III).

Table 1

| Properties | I | II | III |
| --- | --- | --- | --- |
| Gross density (kg/m$^3$) | 17 | 35 | 54 |
| Tensile strength (Kpa) | 75 | 110 | 90 |
| Elongation at break (%) | 135 | 145 | 200 |
| Compression resistance (KPa) | 1.8 | 2.5 | 3.3 |

Table 2

| Fire characteristics (according to ASTM D 1692-74) | | | |
| --- | --- | --- | --- |
|  | I | II | III |
| Burning time, 125 mm-mark (sec) | 27 | — | — |
| Burning length (mm) | — | 36 | 27 |
| Burning time (sec) | — | 44 | 28 |
| Response | drips, falls off; burning | charred | charred |

The experimental results show that a much more flame-resistant foam is obtained by the process according to the invention.

We claim:

1. A flame-resistant polyurethane foam prepared by a process which comprises treating a polyurethane foam with a mixture of (a) a polychloroprene latex containing from 1 to 7% by weight of carboxylic acid units chemically incorporated by polymerization and (b) a flame-resistant amount of aluminum hydroxide and cross linking the latex with a cross-linking agent consisting of zinc oxide or magnesium oxide.

2. A process for the production of a flame-resistant polyurethane foam as claimed in claim 1, wherein the polyurethane foam is treated with from 0.1–8 times its quantity of said mixture, calculated as solid content.

3. A process as claimed in claim 2 wherein the treatment of the polyurethane foam is carried out by spraying the foam with said mixture.

4. A process as claimed in claim 2, wherein the mixture contains from 5–15 parts by weight of zinc oxide or magnesium oxide, based on 100 parts by weight of the dry content of rubber.

5. A process as claimed in claim 2, wherein from 1–3 mol of zinc oxide or magnesium oxide are used per mol of carboxyl groups for cross-linking the polychloroprene latex.

6. A process as claimed in claim 2, wherein the polychloroprene latex contains from 3 to 5% by weight of carboxylic acid units incorporated therein by polymerization.

7. A process as claimed in claim 2, wherein from 5–30% by weight of a halogenated hydrocarbon and/or from 5–30% by weight of antimony-III oxide are added to the polychloroprene latex.

* * * * *